United States Patent [19]

Sparks et al.

[11] Patent Number: 5,706,565
[45] Date of Patent: Jan. 13, 1998

[54] METHOD FOR MAKING AN ALL-SILICON CAPACITIVE PRESSURE SENSOR

[75] Inventors: Douglas Ray Sparks; William J. Baney; Steven Edward Staller, all of Kokomo; Dan Wesley Chilcott, Sharpsville; James Werstler Siekkinen, Carmel, all of Ind.

[73] Assignee: Delco Electronics Corporation, Kokomo, Ind.

[21] Appl. No.: 707,107

[22] Filed: Sep. 3, 1996

[51] Int. Cl.$^6$ .................................................. H01G 7/00
[52] U.S. Cl. ............................................................ 29/25.42
[58] Field of Search ................................. 29/25.41, 25.42, 29/621.1; 73/706, 715, 718, 724; 156/628, 657, 662; 437/901, 919, 921, 927

[56] References Cited

U.S. PATENT DOCUMENTS

| | | | |
|---|---|---|---|
| 4,530,029 | 7/1985 | Beristain | 29/25.42 |
| 4,578,735 | 3/1986 | Knecht et al. | 29/25.41 |
| 4,949,581 | 8/1990 | Rud, Jr. | 73/706 |
| 5,245,504 | 9/1993 | Bullis et al. | 361/283.4 |
| 5,344,423 | 9/1994 | Fung et al. | 156/628 |
| 5,490,034 | 2/1996 | Zavracky et al. | 361/283.4 |
| 5,528,452 | 6/1996 | Ko | 361/283.4 |

Primary Examiner—Richard Chilcot
Assistant Examiner—William L. Oen
Attorney, Agent, or Firm—Jimmy L. Funke

[57] ABSTRACT

An all-silicon monolithic capacitive absolute pressure-sensing device and method for making the same. The device employs a single-crystal silicon diaphragm that serves at a flexible capacitor plate of a variable capacitor. The diaphragm is bonded to a single-crystal silicon wafer to overlie a cavity etched into the wafer. A fixed capacitor plate of the variable capacitor is formed by a heavily-doped region at the bottom of the cavity. A thin dielectric layer is grown on the fixed capacitor plate to complete the capacitor. The cavity has a minimal depth such that the fixed capacitor plate provides overpressure protection for the diaphragm. At least a portion of the operating range of the pressure sensor occurs while the diaphragm is contacting the doped region. As a result, the capacitive output signal of the pressure sensor is produced by changes in contact area between the diaphragm and a thin dielectric situated on the doped region in response to pressure applied to the diaphragm.

12 Claims, 2 Drawing Sheets

METHOD FOR MAKING AN ALL-SILICON CAPACITIVE PRESSURE SENSOR

FIELD OF THE INVENTION

The present invention generally relates to semiconductor pressure sensing devices. More particularly, this invention relates to an all-silicon monolithic capacitive pressure sensor and a method for its manufacture, in which the output signal of the sensor is produced by changes in contact area between a diaphragm serving as a flexible capacitor plate and a thin dielectric situated on a fixed capacitor plate in response to pressure applied to the diaphragm.

BACKGROUND OF THE INVENTION

There is a continuing emphasis for pressure sensors that are lower in cost and smaller in size, yet are characterized by high reliability, sensitivity and linearity. Sensors finding wide acceptance on the basis of furthering these characteristics include those that utilize semiconductor materials with a micromachined sensing diaphragm. There are generally two technologies for micromachined semiconductor pressure sensors—a bulk etching technique and a surface thin film technique. In bulk etching, a silicon wafer is selectively etched to produce a flexible diaphragm overlying a cavity. In surface micromachined sensors, thin films of an electrically conductive material, such as polysilicon or metal, are formed over sacrificial layers on a substrate. By selectively removing portions of the sacrificial layers, the films form a diaphragm that is free to move relative to the substrate in response to an applied pressure. With surface micromachining, sensing can be achieved through a capacitive electrode formed on the diaphragm and a second "fixed" capacitive electrode formed on the substrate underlying the diaphragm, such that a capacitive output is produced based on the distance between the capacitive electrodes.

Considerable prior art exists within the pressure sensing art, and numerous techniques and structures have been proposed for attaining pressure sensors that are lower in cost and smaller in size, while achieving high reliability and performance characteristics. However, as noted above, there is an intense and continuing effort to promote these characteristics, while further optimizing the design of pressure sensors to enhance design flexibility and reduce processing.

SUMMARY OF THE INVENTION

It is an object of this invention to provide an improved method for fabricating an all-silicon monolithic capacitive pressure sensor.

It is another object of this invention that such a method entails a minimal number of processing steps to form a micromachined capacitive sensing element for the pressure sensor.

It is still another object of this invention that such a method yields a pressure sensor that operates within a range in which the sensing element is sufficiently deflected to contact a thin dielectric situated on a fixed capacitor plate, thereby yielding a sensor characterized by enhanced linearity and overpressure protection.

It is still another object that such a method is conducive to optimizing the size and geometry of the sensing element in order to promote its reliability and performance characteristics.

In accordance with a preferred embodiment of this invention, these and other objects and advantages are accomplished as follows.

The present invention provides an all-silicon monolithic capacitive pressure sensor that includes a base wafer and a diaphragm bonded to the base wafer. The diaphragm overlies, but is electrically insulated from, a doped region in a cavity formed in the surface of the base wafer. Both the diaphragm and the doped region are of the first electrical conductivity type, such that the diaphragm forms a flexible capacitor plate and the doped region forms a fixed capacitor plate of the pressure sensor.

According to the invention, the diaphragm forms a hermetic seal around the fixed capacitor plate, such that a gap between the diaphragm and the doped region is isolated from the ambient atmosphere surrounding the pressure sensor. The gap has a depth of about two to seven micrometers, such that at least a portion of the operating range of the pressure sensor occurs while the diaphragm is contacting a thin dielectric situated on the doped region. As a result, the capacitive output signal of the pressure sensor is produced by changes in contact area between the diaphragm and the thin dielectric in response to pressure applied to the diaphragm.

The method for producing the pressure sensor of this invention generally entails forming a doped region within a cavity formed in the base wafer. The doped region can be formed in any portion or be substantially all of the base wafer. A thin dielectric is then formed over the doped region, and the diaphragm is bonded to the base wafer such that the diaphragm overlies the cavity, thin dielectric and doped region. Other than being capacitively coupled through the thin dielectric, the diaphragm and doped region are electrically insulated from each other. The bonding operation also yields a hermetic seal around the fixed capacitor plate, such that the gap between the diaphragm and the doped region is sealed from the ambient pressure conditions surrounding the pressure sensor. As noted above, the gap is specifically sized to enable the diaphragm to contact the thin dielectric on the doped region, such that the capacitive output signal of the pressure sensor is produced by changes in contact area between the flexible and fixed capacitor plates in response to pressure applied to the diaphragm.

From the above, it can be appreciated that the present invention provides a pressure sensor characterized by an uncomplicated fabrication process as well as built-in overpressure protection due to the minimal gap between the diaphragm and the doped region forming the flexible and fixed capacitor plates, respectively. A further advantage of this invention is that the pressure sensor exhibits a larger capacitive output signal as a result of the output being in response to changes in contact area between the diaphragm and the thin dielectric, as opposed to changes in distance between the diaphragm and the doped region. Furthermore, the method of this invention yields a relatively low cost pressure sensor capable of achieving high reliability and high performance within a relatively small sensor package.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings, in which.

DETAILED DESCRIPTION OF THE INVENTION

Figure 5:
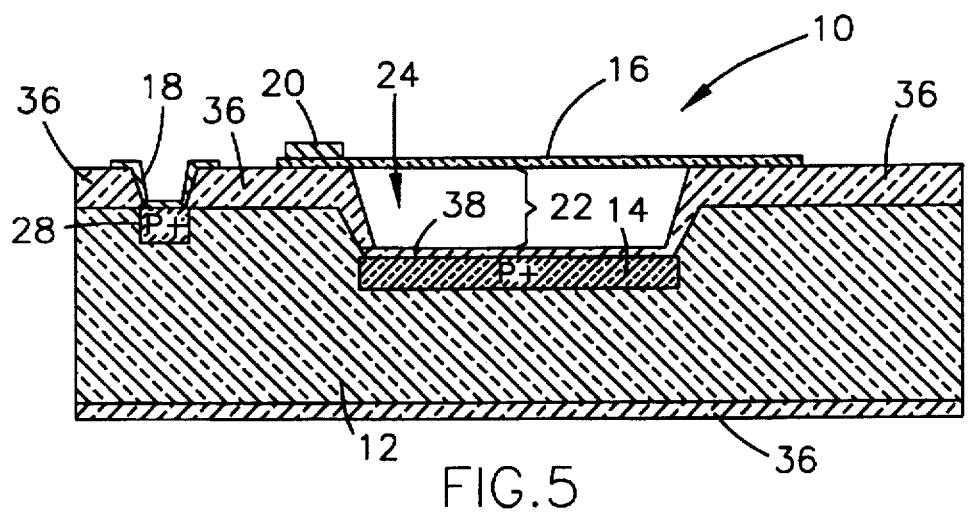
FIG. 5 represents, in cross-section, the pressure sensor of FIGS. 1 through 4 following a final processing step.

FIG. 5 represents an all-silicon monolithic capacitive absolute pressure sensor 10 of a type in accordance with the present invention. As illustrated, the sensor 10 includes a base wafer, referred to as a handle wafer 12, in which a cavity 24 has been formed. The handle wafer 12 includes a doped region 14 within the cavity 24, and a single-crystal silicon diaphragm 16 bonded to the handle wafer 12 so as to hermetically enclose the cavity 24. The doped region 14 and the diaphragm 16 form a fixed capacitive plate and a flexible capacitive plate, respectively, of the capacitive sensor 10. Accordingly, the handle wafer 12, doped region 14 and diaphragm 16 are all suitably doped to be electrically conductive. Bond pads 18 and 20 formed on the handle wafer 12 and diaphragm 16, respectively, provide electrical contacts for the fixed and flexible capacitive plates, respectively. The bond pads 18 and 20 enable conditioning circuitry (not shown) to be electrically interconnected with the capacitive plates through the use of wire bonds, solder bumps, leadframes, or any other conventional technique.

According to this invention, a gap 22 between the diaphragm 16 and the doped region 14 is not more than about ten micrometers, and preferably about two to seven micrometers in depth. It will become apparent that the gap 22 and cavity 24 shown in FIG. 5 are greatly exaggerated for purposes of illustrating the invention. Furthermore, the relative physical relationships that appear in the Figures are primarily for illustrative purposes and should not be construed as a restriction to the teachings of the present invention. Essentially, the size of the sensor 10 can vary considerably, with the process encompassed by this invention being most efficient if multiple sensors 10 are simultaneously formed from a wafer stack that is subsequently sawed to separate the individual sensors 10.

The above structure yields an absolute pressure sensor 10 characterized by a built-in overpressure protection due to the minimal gap 22 between the flexible and fixed capacitor plates formed by the diaphragm 16 and doped region 14, respectively. In addition, the dominant portion of the operating range of the pressure sensor 10 occurs while the diaphragm 16 is contacting (though electrically insulated from) the doped region 14. As a result, the capacitive output signal of the pressure sensor 10 is produced by changes in contact area between the diaphragm 16 and the doped region 14 in response to ambient pressure applied to the diaphragm 16.

Figure 1:
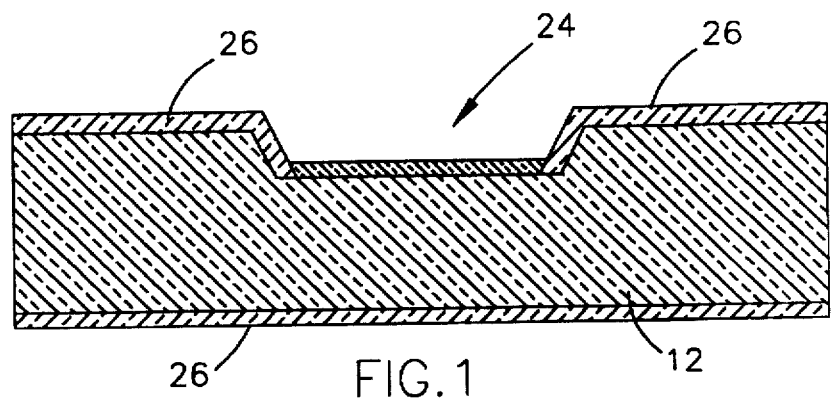
FIGS. 1 through 4 show, in cross-section, processing steps for the manufacture of an all-silicon monolithic absolute pressure sensor in accordance with one embodiment of this invention.

Processing steps for the fabrication and assembly of the sensor 10 of FIG. 5 are generally indicated in FIGS. 1 through 5. As shown in FIG. 1, the handle wafer 12 is a single-crystal silicon wafer. As will become apparent, the wafer 12 can be either lightly-doped or heavily-doped to be either p or n-type. In the embodiment of FIG. 5, the handle wafer 12 is lightly doped p-type to achieve a resistivity of about three to ten ohm-centimeters. A typical thickness for the wafer 12 is about 0.75 millimeters (about 30 mils), though the thickness could vary significantly.

FIG. 1 shows the result of an etch to produce the cavity 24. The depth of the cavity 24 is preferably about two to seven micrometers to yield the preferred gap 22 shown in FIG. 5, though it is foreseeable that a depth of up to about ten micrometers would be acceptable and yet maintain the operating characteristics desired for the pressure sensor 10.

The cavity 24 can be formed by a timed etch into the lightly-doped handle wafer 12 through a mask oxide (not shown) in accordance with known practices. Alternatively, an electrochemically-stopped etch can be employed through a mask oxide if the surface of the wafer 12 is defined by a lightly-doped epitaxial layer while the remainder of the wafer 12 is more highly-doped, as will be discussed in reference to FIG. 6. The surface area of the cavity 24 can be tailored to achieve the desired capacitance range for the sensor 10. In accordance with this invention, the opening formed by the cavity 24 in the surface of the wafer 12 can have any desired shape (e.g., rectangular or circular) and/or the edge and corners between the cavity 24 and the surface of the wafer 12 can be beveled in order to tailor the output-versus-pressure performance of the sensor 10. In one embodiment, the opening and base of the cavity 24 are rectangular-shaped, and the width of the base is about 400 micrometers.

Figure 2:
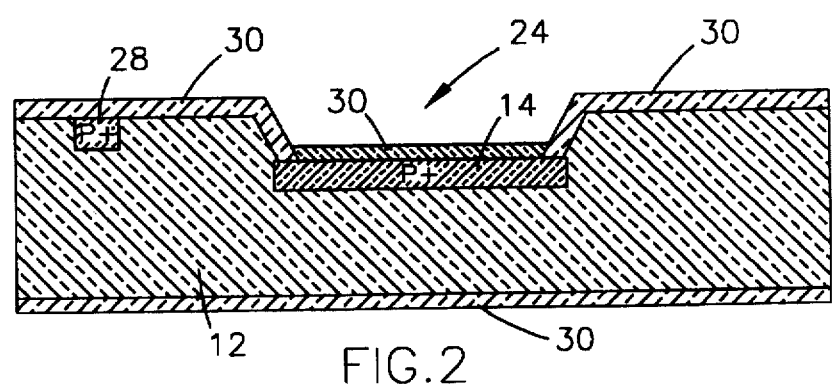

Finally, FIG. 1 shows a masking oxide layer 26 overlying the opposing surfaces of the wafer 12. The thickness of this oxide layer 26 may be about 8000 angstroms, though this thickness could vary. FIG. 2 shows the result of several subsequent processing steps, including the masking and implantation of the doped region 14. For this purpose, the oxide layer 26 on the upper surface of the handle wafer 12 is etched to expose base of the cavity 24, and a suitable P-type dopant for the doped region 14 is introduced either by chemical means or by ion implantation in accordance with known practices. Simultaneously, a portion of the oxide layer 26 at either surface of the wafer 12 can also be etched to enable a p-type contact 28 for the doped region 14 to be formed in the wafer 12. Thereafter, the oxide layer 26 is stripped and an oxide layer 30 grown to a thickness of about 500 to 2000 angstroms.

Figure 3:
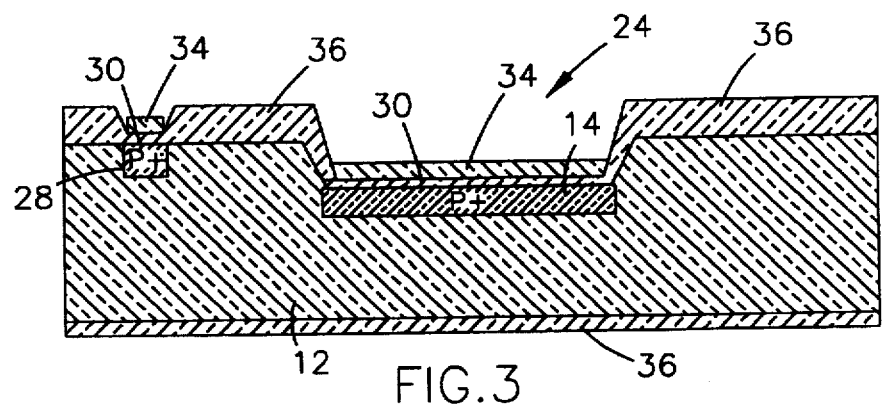

FIG. 3 illustrates the next step in the method of this invention, in which a layer of silicon nitride 34 has been deposited, lithographically defined and then removed everywhere but the bottom of the cavity 24 and the optional contact 28. A local thick oxide (LOCOS) 36 is then grown on the surface areas of the wafer 12 where the silicon nitride 34 has been removed. A suitable thickness for the nitride 34 is about 1000 to 2000 angstroms, while a suitable thickness for the thick oxide 36 is about 10,000 to 25,000 angstroms.

Figure 4:
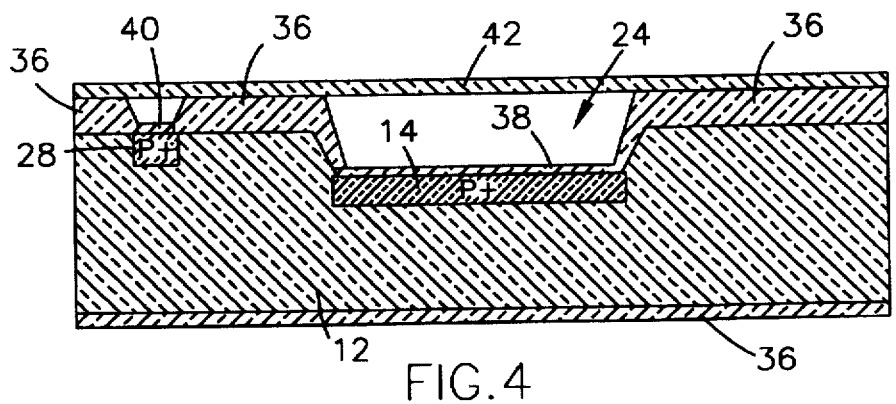

As shown in FIG. 4, the silicon nitride 34 and the remaining oxide layer 30 beneath the nitride 34 has been removed, and a capacitor-quality oxide has been regrown at the bottom of the cavity 24 and over the contact 28. The oxide overlying the bottom of the cavity 24 forms a pad oxide 38, while a resulting oxide layer overlying the contact 28 is identified by the reference number 40 in FIG. 4. As a "capacitor-quality oxide," the pad oxide 38 and the oxide layer 40 are characterized as oxides that have seen no prior processing, as understood by those skilled in the art. A suitable thickness for these oxide layers is about 500 to 2000 angstroms.

As an alternative to the processing steps shown in FIGS. 2 and 3, the thick oxide 36 can be grown immediately after stripping the oxide layer 26. The thick oxide 36 overlying areas corresponding to the desired placement of the pad oxide 38 and oxide layer 40 can then be lithographically defined and removed by etching, followed by growth of the oxide for the pad oxide 38 and oxide layer 40.

As shown in FIG. 5, the pad oxide 38 over the doped region 14 provides a dielectric layer that electrically insulates the doped region 14 (the fixed capacitor plate of the sensor 10) from the diaphragm 16 (the flexible capacitor plate of the sensor 10), the latter of which is also shown in FIG. 4. A preferred method for forming the diaphragm 16 is to provide a second silicon wafer (not shown) having a lightly-doped substrate with a heavily-doped epitaxial layer. Preferred dopants for the epitaxial layer are boron and germanium. Boron contributes to conductivity and provides for etch-stop control, for reasons that will become subsequently apparent, while germanium is desirable as a dopant to promote stress relief within the diaphragm 16. Optionally, an epitaxial layer lightly-doped with boron may be formed over the heavily-doped boron-germanium epitaxial layer for the purpose of increasing the thickness of the diaphragm 16. The heavily-doped boron-germanium epitaxial layer preferably has a thickness of at least about one micrometer. If the lightly-doped epitaxial layer is also present, the total thickness of the two epitaxial layers is preferably about three to seven micrometers.

Thereafter, the second wafer is inverted and the epitaxial layer at the surface of this wafer (the heavily-doped boron-germanium epitaxial layer or, if present, the lightly-doped epitaxial layer) is brought into contact with the surface of the handle wafer 12 in which the cavity 24 is formed. Conventional wafer-to-wafer bonding techniques can then be employed to bond the second wafer to the handle wafer 12 under a vacuum, such that the cavity 24 is evacuated and the resulting wafer-to-wafer bond forms a hermetic seal around the cavity 24 that enables the pressure sensor 10 to sense absolute pressures. The lightly-doped substrate of the second wafer is then etched back, stopping at the heavily-doped boron-germanium epitaxial layer, to leave an epitaxial plate 42 shown in FIG. 4. This plate 42 (consisting of the heavily-doped boron-germanium epitaxial layer and, if present, the lightly-doped epitaxial layer) is then lithographically defined and plasma etched to expose the oxide layer 40 overlying the contact 28, thereby yielding the diaphragm 16 shown in FIG. 5. As such, the diaphragm 16 is formed by the epitaxial plate 42, which consists of the heavily-doped boron-germanium epitaxial layer and optionally the lightly-doped boron epitaxial layer of the second wafer. Furthermore, the resulting thickness of the diaphragm 16 is the total thickness of the epitaxial plate 42, i.e., at least about one micrometer and preferably about four to seven micrometers. As shown in FIG. 5, the perimeter of the diaphragm 16 is bonded to the wafer 12 as a result of the above-noted wafer-to-wafer bonding process, such that a hermetic seal is maintained for the cavity 24.

The pressure sensor 10 formed by the above steps is then placed in a buffered hydrofluoric acid etch to remove the oxide layer 40 overlying the contact 28 (if present). Thereafter, conventional processing may continue, including the formation of the bond pads 18 and 20 by depositing aluminum, aluminum-silicon or aluminum-silicon-copper metallization over the entire wafer. As is conventional, the metallization is then lithographically defined and wet etched to yield the sensor 10 as it appears in FIG. 5. Notably, because the sensor 10 of this invention has an all-silicon construction, it can be integrated with integrated circuit devices, such as control and signal conditioning circuitry, to yield a "smart sensor." For example, appropriate transistor devices can be formed in the surface of the wafer 12 or the epitaxial layers 12b and 42.

Figure 6:
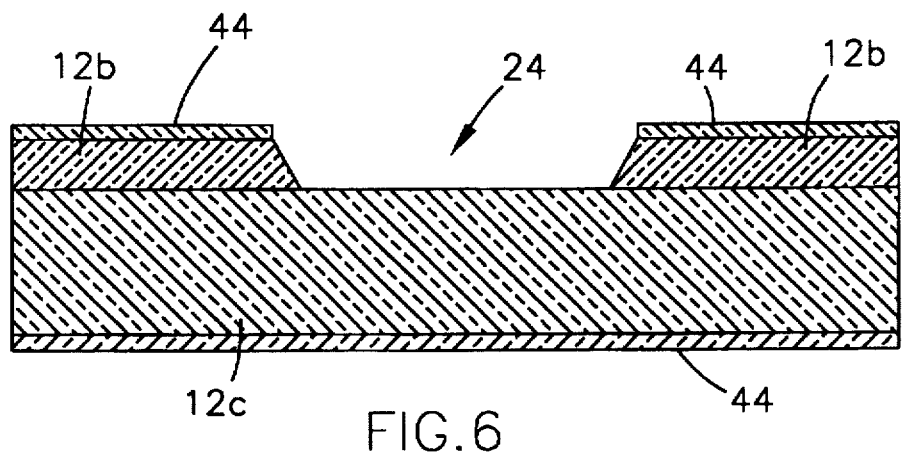
FIGS. 6 and 7 illustrate alternative processing steps in accordance with this invention.

According to this invention, the requirement to form the doped region 14 as a discrete region of the handle wafer 12 can be eliminated by heavily-doping the wafer 12, e.g., P+ type as shown in FIG. 6. In reference to the above-noted techniques for forming the cavity 24, the wafer 12 can be a heavily-doped substrate 12a with an overlying lightly-doped epitaxial layer 12b, as shown in FIG. 6. In so doing, the doped region 14 is formed by the portion of the highly-doped substrate 12a exposed at the bottom of the cavity 24. With this embodiment of the invention, the cavity 24 is formed using an electrochemically-stopped etch through a mask oxide 44, by which the lightly-doped epitaxial layer 12b is preferentially etched while the heavily-doped substrate 12a remains unaffected. Contact to the substrate 12a may be accomplished by removing a portion of the mask oxide 44 from the backside of the substrate 12a and employing standard backside contact techniques.

Figure 7:
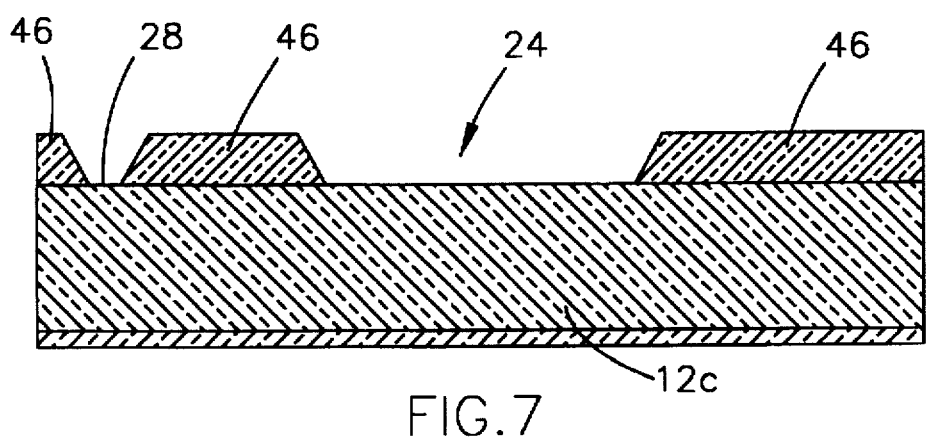

A second processing embodiment of this invention is represented in FIG. 7. As shown, a thick oxide layer 46 is present on the surface of a heavily-doped handle wafer 12c, and exposes a portion of the wafer 12c to form the cavity 24 and contact 28. The cavity 24 can be formed by selectively growing the oxide layer 46 on the surface of the wafer 12c. Alternatively, the cavity 24 can be formed by growing the oxide layer 46 on the entire surface of the wafer 12c, followed by etching to expose the wafer 12c. After growing the capacitor-quality oxide to form the pad oxide 38 and the oxide layer 40 (not shown) on the exposed surface regions of the wafer 12c, processing of the wafer 12c can proceed to the level shown in FIG. 4.

In view of the above alternative processing techniques, the term "doped region" as used herein is not to be construed as limited to a discrete region that has been selectively formed in the surface of the handle wafer 12, but may encompass a large region of the wafer 12 or a heavily-doped substrate 12a/12c underlying a lightly-doped epitaxial layer 12b or a thick oxide layer 46 at the surface of the wafer 12.

While conventional silicon processing materials can be employed to form the sensor 10 as noted above, other materials could be used, including elemental and compound semiconductor materials, or layers of conducting and insulating materials. As those skilled in the art will appreciate, the choice of materials will determine the appropriate processes for forming selective regions of conductivity in the handle wafer 12. In addition, while p-type and n-type regions in semiconductor devices are generally interchangeable, each conductivity type incurs tradeoffs that would be appreciated and accommodated by one skilled in the art. Consequently, it is foreseeable that the present invention can be utilized to encompass a multitude of applications through the addition or substitution of other processing or material. It is also foreseeable that the processing techniques described above could be used to make piezoresistive or piezoelectric pressure sensors.

Therefore, while our invention has been described in terms of a preferred embodiment, other forms could be adopted by one skilled in the art. Accordingly, the scope of our invention is to be limited only by the following claims.

The embodiments of the invention in which an exclusive property or privilege is claimed are defined as follows:

1. A method for forming a capacitive pressure sensor, the method comprising the steps of:

providing a first semiconductor wafer having at least a portion thereof characterized by a first electrical conductivity;

forming a cavity in the first semiconductor wafer so as to expose a region of the semiconductor wafer that yields a fixed capacitor plate of the capacitive pressure sensor;

bonding a semiconductor diaphragm of the first electrical conductivity type to the semiconductor wafer such that the diaphragm overlies the fixed capacitor plate, is electrically insulated from the fixed capacitor plates, and forms a hermetic seal around the fixed capacitor plate, the diaphragm being a flexible capacitor plate of the capacitive pressure sensor;

wherein the flexible capacitor plate forms a gap with the fixed capacitor plate of up to about ten micrometers, such that a capacitive output signal of the capacitive pressure sensor is produced by changes in contact area between the diaphragm and the semiconductor wafer in response to pressure applied to the diaphragm.

2. A method as recited in claim 1 wherein the diaphragm is bonded to the semiconductor wafer to overlie a limited portion of the semiconductor wafer and yield an exposed surface portion of the semiconductor wafer, the method further comprising the step of forming a contact to the flexible capacitor plate in the exposed surface portion of the semiconductor wafer.

3. A method as recited in claim 1 wherein the diaphragm is caused to be of the first electrical conductivity type by doping with boron and germanium.

4. A method as recited in claim 1 further comprising the step of forming a doped region of the first electrical conductivity type in the region of the semiconductor wafer, the doped region forming the fixed capacitor plate of the capacitive pressure sensor.

5. A method as recited in claim 1 wherein the semiconductor wafer comprises a heavily-doped substrate and an overlying layer of a lightly-doped epitaxy or an oxide, and wherein the step of forming the cavity entails removing a portion of the overlying layer to expose a portion of the substrate, the portion of the substrate forming the fixed capacitor plate of the capacitive pressure sensor.

6. A method as recited in claim 1 wherein the semiconductor wafer comprises a heavily-doped substrate and an overlying oxide layer, and wherein the step of forming the cavity entails selectively growing the oxide layer on the substrate so as to form the cavity and leave exposed a portion of the substrate, the portion of the substrate forming the fixed capacitor plate of the capacitive pressure sensor.

7. A method as recited in claim 1 further comprising the step of forming a dielectric layer between the region of the substrate and the diaphragm so as to electrically insulate the flexible and fixed capacitor plates.

8. A method as recited in claim 7 wherein the dielectric layer is an oxide layer grown on the region of the substrate.

9. A method as recited in claim 1 wherein the semiconductor wafer is a first semiconductor wafer, and wherein the flexible capacitor plate is formed by a method comprising the steps of:

forming a second semiconductor wafer comprising a substrate and an epitaxial layer doped to be of the first electrical conductivity type;

bonding the second semiconductor wafer to the first semiconductor wafer such that the epitaxial layer contacts the first semiconductor wafer and overlies the underlying region of the substrate; and etching the second semiconductor wafer to remove the substrate and leave the epitaxial layer to form the diaphragm and the flexible capacitor plate.

10. A method as recited in claim 9 further comprising the step of removing a portion of the epitaxial layer of the second semiconductor wafer to expose a surface portion of the first semiconductor wafer.

11. The capacitive pressure sensor formed by the method recited in claim 1, the capacitive pressure sensor being an all-silicon monolithic absolute pressure sensor.

12. A method for forming a capacitive pressure sensor, the method comprising the steps of:

providing a first semiconductor wafer characterized by a first electrical conductivity type;

forming a cavity in a surface of the first semiconductor wafer;

forming a doped region of the first electrical conductivity type in the cavity to yield a fixed capacitor plate of the capacitive pressure sensor;

forming a dielectric layer over the doped region;

forming a second semiconductor wafer comprising a substrate and an epitaxial layer doped to be of the first electrical conductivity type;

bonding the second semiconductor wafer to the first semiconductor wafer such that the epitaxial layer contacts the first semiconductor wafer and overlies the doped region;

etching the second semiconductor wafer to remove the substrate;

removing a portion of the epitaxial layer to expose a surface portion of the first semiconductor wafer so as to form a diaphragm that is electrically insulated from the fixed capacitor plates and forms a hermetic seal around the fixed capacitor plate, the diaphragm being a flexible capacitor plate of the capacitive pressure sensor;

wherein the flexible capacitor plate forms a gap with the fixed capacitor plate of about two to about seven micrometers, such that a capacitive output signal of the capacitive pressure sensor is produced by changes in contact area between the diaphragm and the semiconductor wafer in response to pressure applied to the diaphragm.

* * * * *